May 25, 1965   K. MEYER ETAL   3,185,464
IRON ORE REDUCING ROTARY FURNACE WITH MANTLE
BURNER NOZZLES OF CONCENTRIC TUBES
Filed May 29, 1963

INVENTORS
Kurt Meyer
Günter Heitmann
Wolfgang Janke
BY Bailey, Stephens and Huettig
ATTORNEYS 3,185,464
IRON ORE REDUCING ROTARY FURNACE WITH MANTLE BURNER NOZZLES OF CONCENTRIC TUBES
Kurt Meyer and Günter Heitmann, Frankfurt am Main, and Wolfgang Janke, Obenursel, Taunus, Germany, assignors to Metallgesellschaft Aktiengesellschaft, Frankfurt am Main, Germany
Filed May 29, 1963, Ser. No. 284,134
Claims priority, application Germany, June 19, 1962, M 53,257
1 Claim. (Cl. 266—24)

This invention relates to a rotary cylindrical furnace and, in particular, is directed to the burners in the furnace.

So-called mantle burners are well known in rotary furnaces. These burners are composed of tubes positioned along the length of the furnace and extending through the wall of the furnace to approximately the center line of the furnace. The ends of the tubes have nozzles directed substantially axially of the furnace.

In rotary cylindrical furnaces, it is common to reduce iron ore with solid carbonaceous reducing agents, such as a mixture of coke with iron ore pellets free of carbon, or iron ore pellets containing carbonaceous material, by means of the CO generated from the carbon to obtain a sponge-iron product.

As shown by Moklebust Patent No. 2,829,042, attempts have been made to control the temperature range throughout the longitudinal length of the furnace by means of injected air. Further, according to a heretofore unpublished disclosure, it has been found that the temperature can be controlled by mantle burners and thereby economically use the carbon content of furnace-charged ore. These burners preferably have nozzles directed against the direction of the flow of gas through the furnace. This invention further improves the heretofore known processes and apparatuses.

In this invention, it has been found that the regulation of the temperature in the different zones of the furnace can be accomplished if the heat required for the keeping of a temperature in a particular zone is obtained only partly from fuel coming from a supply outside the furnace and partly by combustion of the CO contained in the furnace atmosphere. The heat required by the furnace is thus supplied by these two heat sources so that in any furnace zone the optimum CO concentration is maintained, particularly in the raw or inlet zone of the furnace and where CO is not essential as the iron oxide has not reached its reduction temperature, the heat there required can be supplied predominantly or entirely by combustion of the entire CO content of the atmosphere.

Thus the furnace operation of this invention requires mantle burners having a performance over a very wide rang of combustion air and fuel mixture ratios. The lower ratio limit is fuel only, whereas the upper ratio limit is pure air with no added fuel, or with a oxygen-containing gas.

As shown in Wienert Patent No. 2,941,791, a fuel and air mixture can be formed in a combustion chamber exteriorly of the rotary furnace and the burning mixture injected into the furnace through a mantle burner nozzle. This ensures that the combustion is as complete as possible and free from soot.

However, the use of the exterior combustion chamber does not permit an extensive variation in the fuel-air ratio, because after a certain critical value, the flame flashes back from the nozzle. Consequently, the heat is not applied out of the nozzle but within the burner tube and causes undesirable baking.

The means by which the objects of this invention are obtained are disclosed more fully with respect to the accompanying schematic drawings in which.

Figure 1:
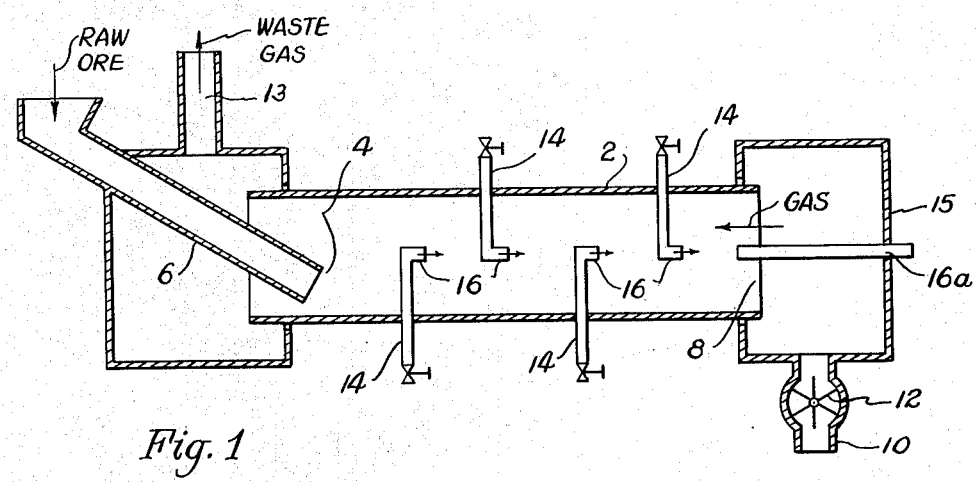
FIGURE 1 is a cross-sectional view through a rotary cylindrical furnace.

As shown in FIGURE 1, the rotary cylindrical furnace has an inlet end 4 which receives the raw ore through a chute 6. The ore passes through the furnace while being reduced and is discharged through outlet end 8 to a chute 10 having a gate valve 12. A central burner, not shown, may be provided on pipe 16a at the discharge end of the kiln. The enlargement 15 shown in the drawing is advantageous but not indispensable. The CO and other gases produced during the reducing of the ore flow from the outlet end 8 to the inlet end 4 and up through the stack 13. Positioned along the length of the furnace are mantle burners composed of tubes 14 extending through the walls of the furnace and terminating in nozzles 16 directed toward the outlet and 8 and against the flow of gas through the furnace. These nozzles are positioned approximately at or slightly beyond the center line of the furnace.

Figure 2:
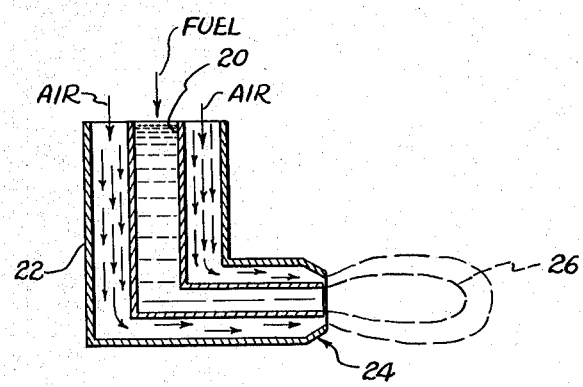
FIGURE 2 is an enlarged detail view of a mantle burner according to this invention.

As shown in FIGURE 2, the mantle burners 14 are composed of an inner fuel tube 20 concentric with an outer air tube 22, which tubes are extended into the nozzle 24.

According to this invention, the disadvantage of premixing the fuel and air in a combustion chamber exteriorly of the furnace is overcome. In this invention, the fuel alone is supplied through inner fuel tube 20 and not mixed with the air and burned until it leaves the nozzle as indicated by the dashed lines 26. Thus this nozzle resembles that of a metal welding torch.

In this invention, it has been unexpectedly found that under the conditions prevailing in a rotary cylindrical furnace during the reduction of iron ores by means of CO generated from solid carbon mixed with the ore, the fuel and the combustible components contained in the furnace gases are burned substantially completely even though the fuel and combustion air are supplied at a pressure considerably less than that used in a welding torch. In order to ensure complete combustion of the fuel, an excess pressure of 500 mm. water column for the fuel gas suffices. In each furnace zone occupied by a particular mantle burner 14, the air to fuel mixture can be varied so that the oxygen in the air is consumed before it can re-oxidize or prevent the reduction of the heated iron ore and that the CO generated can be burned to produce heat to the fullest extent, thus conserving the use of fuel in the mantle burner. As a result, more CO is utilized for heating the furnace and less is discharged through the inlet end 4 where it is not required for reducing.

Having now described the means by which the objects of the invention are obtained, we claim:

In a rotary furnace for reducing iron ore and having a plurality of mantle burners positioned within the furnace along the longitudinal length of the furnace with the burner nozzles substantially concentric with the longitudinal axis of the furnace and directed against the flow of gases through the furnace, the improvement in which each nozzle of the mantle burners is composed of an inner fuel tube concentric with and spaced from an outer air tube, said tubes being substantially coextensive so that the fuel emitted from the nozzle is enveloped by the air emitted from the nozzle and so that the fuel and air thus obtained are mixed and burned in the furnace after leaving the nozzle for maintaining a substantially uniform temperature throughout the iron ore reduction zone in the furnace by means of both burning carbon monoxide gas generated from solid carbon added to the iron oxide ore and burning gas coming from the mantle burner nozzles.

References Cited by the Examiner
UNITED STATES PATENTS

| | | | |
|---|---|---|---|
| 1,976,208 | 10/34 | Agthe et al. | 158—110 |
| 2,911,035 | 11/59 | Nieman et al. | 158—99 |
| 2,941,791 | 6/60 | Wienert | 75—34 XR |

MORRIS O. WOLK, *Primary Examiner.*

JAMES H. TAYMAN, JR., *Examiner.*